United States Patent [19]

Stemple et al.

[11] 3,818,596

[45] June 25, 1974

[54] COUNTERBALANCE FOR A VERTICALLY SUPPORTED PROBE SHAFT

[75] Inventors: James M. Stemple; Paul E. Allen, both of Springfield, Ohio

[73] Assignee: The Bendix Corporation, Dayton, Ohio

[22] Filed: Mar. 29, 1973

[21] Appl. No.: 345,913

[52] U.S. Cl.............. 33/1 M, 33/174 P, 74/422, 248/123, 248/162
[51] Int. Cl.................. G01b 5/20, F16m 11/04
[58] Field of Search...... 33/1 M, 1 R, 169 B, 169 R, 33/23 H, 23 K, 174 L, 174 P, 143 L, 147 N

[56] References Cited
UNITED STATES PATENTS

| | | | |
|---|---|---|---|
| 2,695,086 | 11/1954 | Parker | 192/21.5 |
| 2,742,805 | 4/1956 | Nelson | 192/21.5 |
| 2,966,831 | 1/1961 | Brodbeck | 33/23 H |
| 3,241,243 | 3/1966 | Speer | 33/174 L |
| 3,757,423 | 9/1973 | Weig | 33/174 R |
| 3,774,312 | 11/1973 | Esch | 33/174 L |

Primary Examiner—Louis R. Prince
Assistant Examiner—John W. Shepperd
Attorney, Agent, or Firm—John R. Benefiel

[57] ABSTRACT

A counterbalance arrangement is disclosed for a vertically supported coordinate measuring machine probe shaft. This arrangement consists of an electric motor coupled to a variable torque magnetic particle clutch, which clutch is capable of being set to a torque transmission level corresponding to the weight of the probe shaft. The output of the magnetic particle clutch is drivingly engaged with the probe shaft by means of a gear meshing with a rack secured to the probe shaft.

2 Claims, 3 Drawing Figures

COUNTERBALANCE FOR A VERTICALLY SUPPORTED PROBE SHAFT

BACKGROUND OF THE INVENTION

1. Field of the Invention

This invention concerns counterbalances, and more particularly counterbalances for a vertically supported probe shaft for a measuring machine.

2. Description of the Prior Art

Coordinate measuring machines of the type described in U.S. Pat. No. 3,403,448 utilize a vertically supported probe shaft which is moved into contact with the object being measured to determine the dimensions between points of interest thereon. This movement is commonly carried out manually, i.e., a lock is released and the probe shaft is supported by the operator as it is raised and lowered in making the measurements. While this arrangement is satisfactory for relatively small machines, the probe shaft weight becomes excessive, and some means of counterbalancing the weight of the probe shaft becomes desirable.

Typical counterbalancing approaches such as cables and weights, springs, and the normal electrical motorization all have substantial disadvantages in the context of coordinate measuring machines.

Cables, weights, and springs tend to be bulky and cumbersome, add weight to the Y-axis carriage and may impose forces on the probe shaft causing inaccurate measurements. They also are not easily adjustable for varying probe shaft weights which occurs when differing probe tip configurations are used, nor to cause powered elevation of the probe shaft.

Electric motors on the other hand have a tendency to index so that normal fine position adjustment is difficult, and some installations preclude manual manipulation of the probe shaft.

Examples of prior art counterbalances are found in U.S. Pat. Nos. 2,840,333; 2,659,827; and 2,522,125.

Thus, it is an object of the present invention to provide a counterbalance arrangement for a coordinate measuring machine probe shaft which is simple, lightweight, which force is easily adjustable for varying probe weights or to power the probe elevation.

SUMMARY OF THE INVENTION

This and other objects of the invention which will become apparent upon a reading of the following specification and claims is accomplished by means of an electric motor driving a variable torque magnetic particle clutch which in turn drives the probe shaft via a rack and pinion connection. A variable current power supply controls the torque level so that it may be adjusted to just balance the probe weight, while allowing manual movement of the probe shaft.

DETAILED DESCRIPTION

Figure 1:
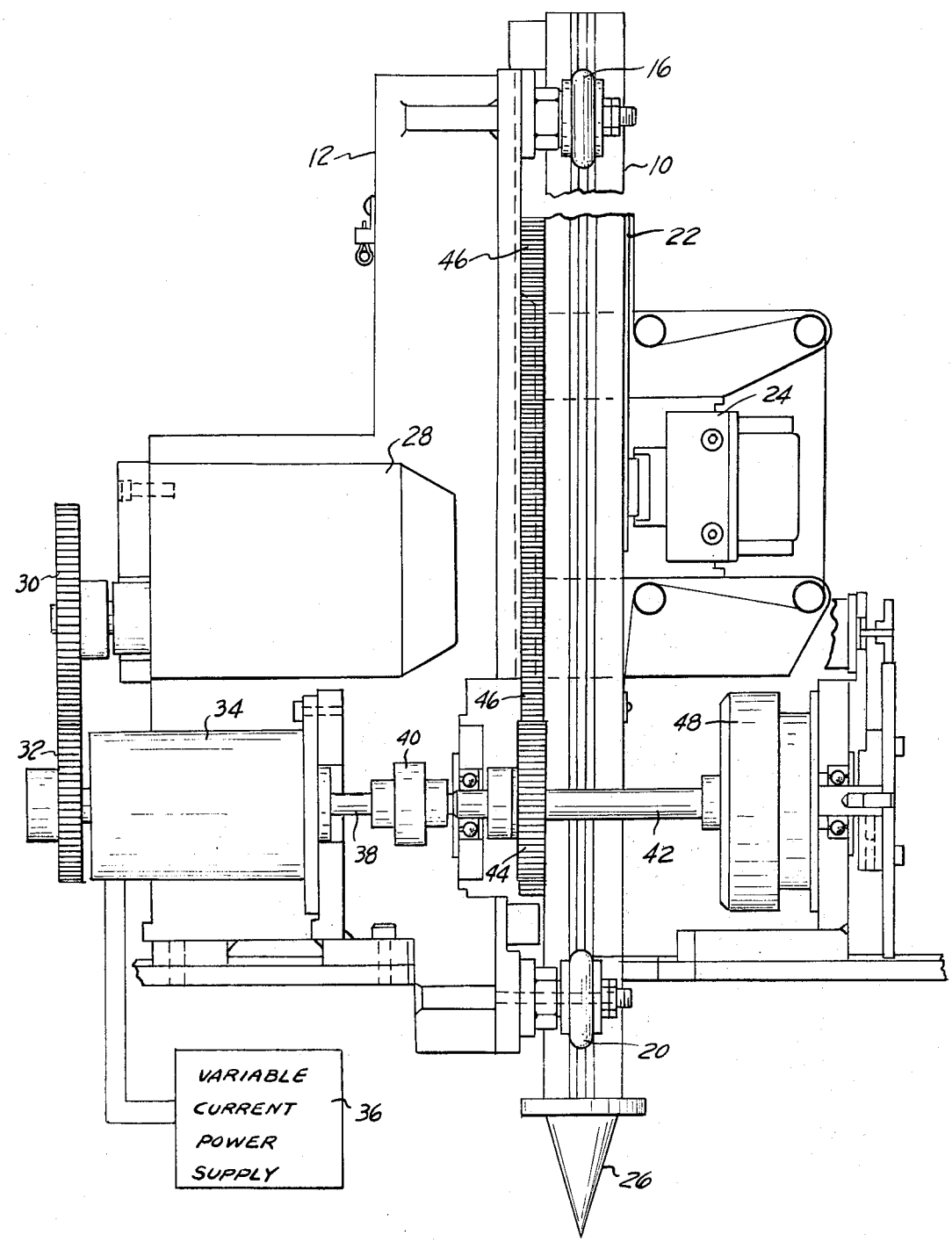
FIG. 1 is a front elevational view of a portion of a coordinate measuring machine showing the probe shaft counterbalance arrangement according to the present invention.
Figure 2:
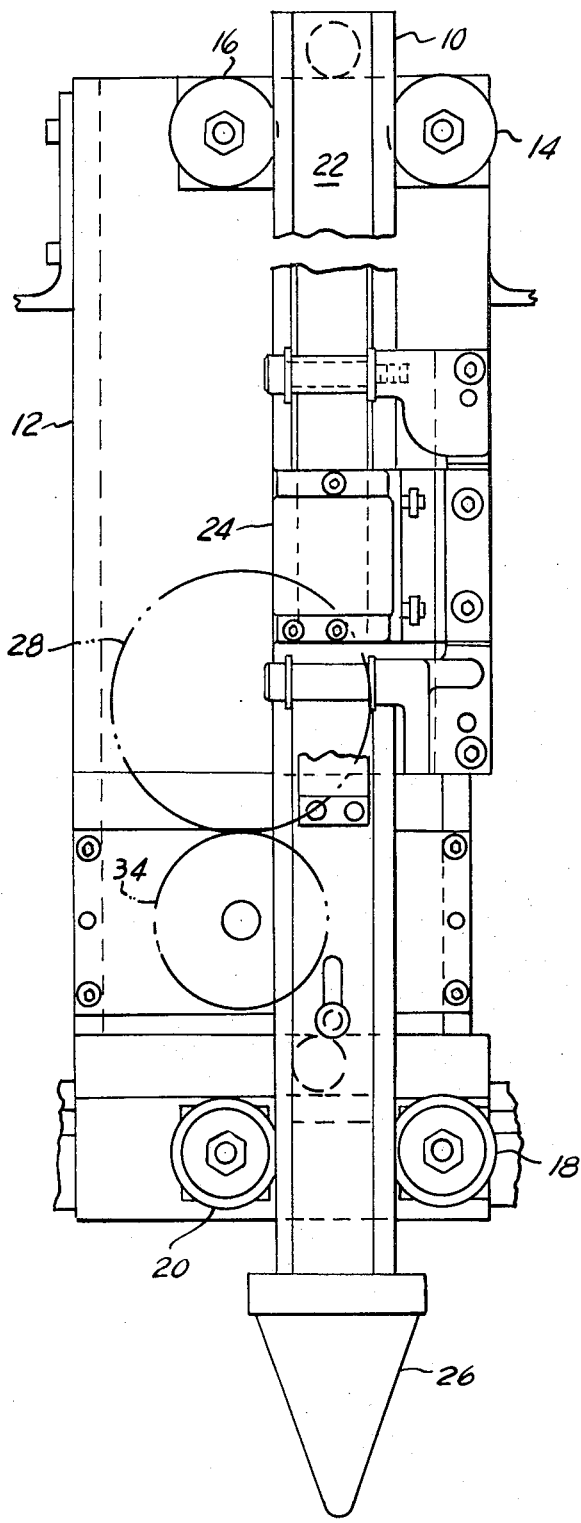
FIG. 2 is a side elevational view of a portion of coordinate measuring machine shown in FIG. 1 showing the probe shaft support arrangement.
Figure 3:
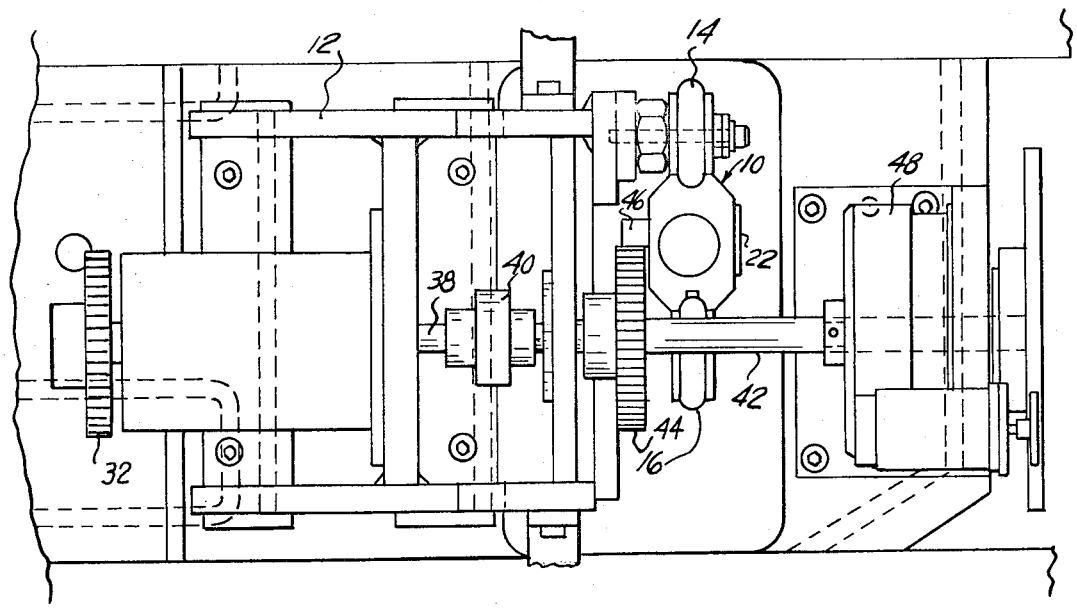
FIG. 3 is a plan view of a portion of the coordinate measuring machine shown in FIGS. 1 and 2 showing the probe shaft support and counter-balance arrangement according to the present invention.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the drawings, a probe shaft 10 is depicted, which is supported for vertical movement as a carriage 12, by means of four bearings 14, 16, 18, and 20. The carriage 12, normally referred to as the Y-axis carriage is in turn supported for linear movement on an X-axis carriage (not shown) in the manner now well known in the art. The vertical movement of the probe corresponds to Z-axis movement in this coordinate system.

Vertical movement of the probe shaft 10 generates electrical signals corresponding to this movement by means of a grating 22 affixed thereto and a reading head 24 secured to the carriage 12 and disposed adjacent the grating 22. The reading head 24 includes a fixed grating positioned so as to generate a Moire' fringe pattern which shifts as relative movement between the grating 22 and the reading head 24 occurs, which pattern is read by photocells to produce the electrical signals corresponding to movement of the probe. This arrangement in itself is also well known in the art and is not a part of the present invention and accordingly a detailed description thereof is not here included.

It can be appreciated from this description however that if Z-axis dimensions of an object are measured by this vertical movement, this vertical motion must be completely true to obtain accurate results, and if varying bending forces are imposed on the probe shaft 10, so that it is slightly bowed, the probe tip 26 will have a tendency to move off the true Z-axis creating inaccuracies in measurements. This could occur in certain of the cable and weight counterbalance arrangements known in the prior art.

The counterbalance arrangement according to the present arrangement includes drive means comprising an electric motor 28 mounted on the carriage 12, and drivingly engaged via spur gears 30, 32 to a variable torque magnetic particle clutch 34, also mounted on the carriage 12. Suitable magnetic particle clutches are commercially available, and have operating characteristics such that the torque transmitted therethrough can be set by means of a variable current power supply 36. This type of clutch has the additional characteristic that the clutch can be continuously slipping while transmitting a selected torque level. Thus, this torque level can be set to just correspond to the probe shaft assembly weight so that no movement of the probe shaft 12 occurs but the electric motor 28 is continuously running. Further manual movement can be instantly carried out with no interference from the counterbalancing forces so generated.

Inasmuch as such clutches are commercially available, and are well known in themselves in the art, a detailed description is not here included.

The output 38 of the magnetic particle clutch is drivingly connected to the probe shaft 10 by means of a coupling 40, shaft 42, and a pinion gear 44 affixed thereto, which pinion gear 44 is in turn drivingly engaged with a rack 46 secured to the probe shaft 12.

This arrangement eliminates the imposition of bending forces on the probe shaft 12 which forces if imposed could lead to the inaccuracies referred to above.

In order to provide a failsafe locking arrangement, a spring applied electrically released brake 48 also carried by carriage 12 and connected to the shaft 42 is utilized. The brake 48 is wired into the power circuit of the electric motor 28 and magnetic particle clutch 34 so that whenever power is supplied to both of these the shaft 42 is free, but if power is interrupted to either, the brake 48 is applied so that the probe shaft 12 is securely held.

From this description it can be appreciated that the torque level can be easily adjusted for varying probe shaft assembly weights, and can be adapted to powered probe positioning systems, i.e., a torque level allowing rise or fall of the probe under joy-stick or remote control.

I claim:

1. A counterbalance arrangement for a coordinate measuring machine probe shaft comprising:
    a probe shaft;
    bearing means supporting said probe shaft for vertical movement;
    rotary drive means;
    a variable torque magnetic particle clutch driven by said rotary drive means;
    means drivingly connecting the output of said magnetic particle clutch to produce said vertical movement of said probe shaft in response to rotation of said output of said magnetic particle clutch;
    means for adjusting the torque of said magnetic particle clutch to balance the weight of said probe shaft, whereby the weight of said probe shaft is counterbalanced by said drive means and magnetic particle clutch.

2. The arrangement of claim 1 wherein said means drivingly connecting said magnetic particle clutch output and said probe shaft includes a rack fixed to said probe shaft and a pinion gear driven by said output whereby bending loads on said probe shaft are eliminated.

* * * * *